United States Patent Office 3,169,257
Patented Feb. 16, 1965

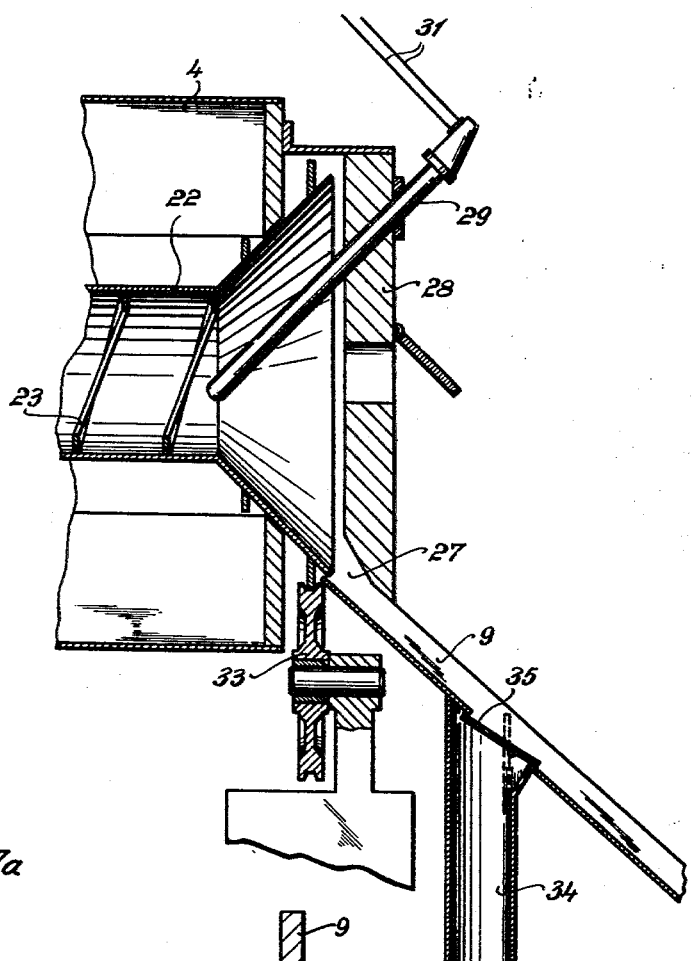
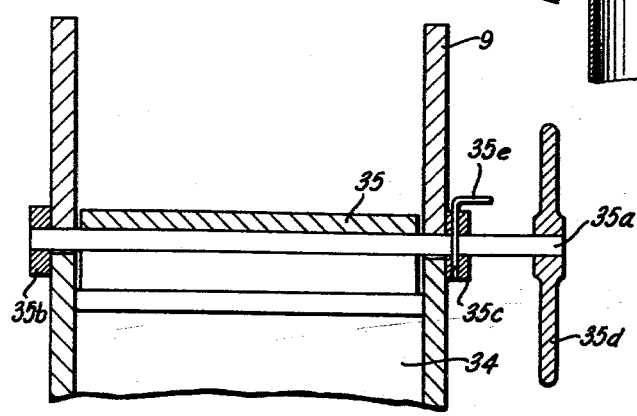

3,169,257
PROCESS FOR PRODUCING NUTS
Wilhelm Loos and Wilhelm Meier, Plettenberg, Germany, assignors to Loos & Schmidt, Plettenberg, Germany, a firm of Germany
Original application Aug. 12, 1957, Ser. No. 677,590. Divided and this application May 27, 1959, Ser. No. 819,529
4 Claims. (Cl. 10—86)

This is a division of application Serial No. 677,590, filed August 12, 1957, and now abandoned.

The present invention relates to a process for producing nuts from round steel blanks, which are subsequently shaped into round pressed pieces by upsetting, then pre-pierced and shaped into hexagonally formed pieces, and finally perforated.

Many processes are already known for making nuts; the known processes mainly are of two kinds, i.e., hot-pressing and cold-pressing processes. In the hot-pressing process, rod-shaped stock of rods is heated whereupon individual pieces are cut from the rods and are successively upset, pierced and shaped into nuts. In this process, the rods have to be heated to high temperatures in order to assure a proper heating of the core. On account of this heating, the surface becomes flaky and the nuts made from the rods are no longer accurate in size. The tools used in the production of the nuts have to be cooled continuously.

In the cold-pressing processes, all operations are performed on cold blanks. When nuts are made according to the cold-pressing process, expensive stock has to be used, having good cold-upsetting properties. Nuts made in that manner have to be annealed in a special operation. The surface of the nuts made by cold-pressing often shows cracks. The forces required for shaping are much higher than in the hot-pressing process.

In order to improve the known processes and operations, a method has been suggested in which intermediate annealing was to be performed before the two last shaping operations. This method has the purpose to decrease the resistance to shaping which is high in blanks processed by cold-pressing. For instance, an intermediate annealing to relieve stresses is carried out after the blank has been shaped, whereupon the pressed article is again worked upon in the cold so as to increase its strength. The intermediate annealing has the disadvantage that the cold-pressed piece, upon being annealed, is again cooled and only then further worked upon for the increase of its strength. However, nuts being articles made by mass-production, delays in the course of the manufacturing operations are very inconvenient. Consequently, in spite of the known shortcomings, the manufacture of nuts was mainly done by the initially described conventional methods of hot- or cold-pressing.

The shaping operations per se are generally known and are carried out in the same manner throughout, except for insignificant divergencies. As stated in the beginning, nuts are made from round steel blanks which are shaped into round pressed pieces by upsetting, pre-pierced and shaped into hexagonal pieces, and finally perforated. These operations are carried out in both hot-pressing and cold-pressing.

The present invention is a development of the cold-pressing process and has the object of providing a simple and more advantageous method of nut production.

According to the invention, this is achieved by heating the round pressed pieces, made in the cold, to a temperature of 600 to 800° C. before further shaping operations. In working according to the invention, heating is utilized for facilitating the subsequent shaping operations whereby time is saved and heavy tools become dispensable to a considerable extent. The expenses in machinery for the further shaping processes in the hot state are also reduced thereby. aWstes, as they are often found in cold-upsetting even after the known intermediate annealing, are eliminated by the process according to the invention. The output in nuts made according to the novel process is a multiple of the output resulting from conventional cold-shaping processes in view of the shortened time of manufacture. The accuracy in size of the nuts is also much greater than with the known processes. Another advantage is the easier thread-cutting in blanks made according to the invention than in nuts made according to the known cold-pressing, with or without intermediate annealing. The process of the invention also differs from the known processes in the following respects.

The waste encountered in the heating of entire rods is considerably reduced. The heating expenses are decreased by virtue of the lower operating temperatures. Heating of the core of the rounds is considerably faster owing to their larger surface, than the heating of the interior of a like mass of rod material. Flake formation is reduced through faster heating. Another advantage is that the amount of stock present in the furnace at one time can be substantially smaller. This in turn permits use of smaller furnace units. The necessary space is correspondingly smaller and this results in a reduction of the heat dissipation. Since there is thus a substantial decrease in radiant heat, workers will not be inconvenienced thereby. Heat losses due to a second heating which becomes necessary upon failure of machinery, which requires emptying of the furnace, are decreased; the same is true when tools have to be changed.

In the known cold-pressing processes with the intermediate annealing, the r.p.m. of the finishing press is so low that two machines are required for making full use of the preliminary press. In the process according to the present invention it is possible to adjust the r.p.m. of the finishing press to that of the preliminary press. The finishing press is capable of pressing as many rounds in medium-hot state to final shape as are upset in the cold state in the preliminary press.

Therefore not only is one machine entirely dispensed with, but the remaining finishing press may have considerably smaller dimensions since, thanks to the lower resistance of the material to shaping, a smaller compression force will be sufficient. Energy input and maintenance costs are reduced; the main tool is subject to less wear and tear. Instead of the intermediate annealing, a warm up operation is performed for the purpose of facilitating the main shaping operation. The conventional phosphating step is eliminated. The shaping temperature can be utilized for a subsequent heat refining treatment.

As compared to the cold-pressing process, the starting material does not require any particular cold-upsetting properties; damaging due to cold shaping does not occur. One operation of preliminary shaping may be dispensed with.

The method hitherto in use required five operations and some transverse travel all of which involved considerable equipment, consequently there were many more incidents of mechanical failure; adjustment of tools and supervision also were more difficult. The machinery was subject to high wear due to the high pressures involved. Though nuts made by a true cold-pressing process will have a high final strength surpassing that of the initial stock by up to 50%, a strength which cannot entirely be matched by the products obtained in the process according to the invention since toughening obtained during preliminary shaping is partly lost in the heat of the final shaping operation, the nuts made by the semi-hotpressing process, according to this invention, will have a very even structure and high extensibility. As far as these properties are concerned, the nuts obtained according to the invention are superior to nuts made by the hot-shaping process from iron especially used for that purpose and shaped at 1150° C. Moreover, coarse-grain formation liable to occur at higher temperatures will never be observed with the present method.

In the following, the process according to the invention will be described as carried out, by way of example, in a plant comprising a simple horizontal cold press, a furnace with a steel screw conveyer, and a finishing press with horizontal or vertical crank drive.

The starting material is rolled and drawn round steel in ring shape. On the cold press the rod, which has a diameter of 70–80% of the final nut or spanner width, is pushed against an adjustable stop by draw rollers. A shearing knife mounted on a carriage cuts off a predetermined piece and feeds it to the pressing tool. After the shearing knife has been retracted, the cut rod section is shaped to a round by a punch in the main slide, the round having a diameter of 95–96% of the final nut width. The rounds are fed by way of a magazine having a pusher to a closed vertical slotted discharge chute. The rounds are arranged in a column from which the lowermost is fed to the furnace by means of a slide operating in timed relationship with the shaping press by means of a spring-controlled flap. The slide may be locked so that the feeding may be interrupted at any time.

In the furnace, the rounds are heated in a countercurrent to a temperature of 600° to 800° C., the exact temperature depending on the composition of the starting material. The amount of flake formation occurring in the range of temperature mentioned is negligible and the flakes are eliminated by the constant movement of the rounds in front of the screw. From the heating zone of the furnace, the rounds drop through a chute in front of a slide. The number of heated rounds delivered in a given time interval is controlled by a gradual regulation of the rotary speed of the furnace. The slide grips the rounds and passes them over the lower die of a press. The punch of the upper die, having a projecting piercer, presses the round into the lower die, whereupon the slide returns to its starting position. In the die the blank is shaped to its final form and pre-pierced. After the upper die member with piercer has been retracted, the shaped blank is pushed out of the lower die onto a cross-conveyor with gripping means which passes on the pressed blank to a tool for pushing out the center of the pierced blank. With each stroke of the slide a finished nut will be made.

All tools are cooled indirectly by water. The dies are additionally cooled, when open, by a current of air which simultaneously cleans them and atomizes a lubricant serving to reduce the friction between the pressed nut and the die walls.

The heat remaining in the shaped pieces can be utilized, after a slight reheating, for annealing.

For carrying out the process according to the invention fully automatically, a combination of units is suggested comprising a cutting device with pre-pressing device for the cutting and preliminary shaping of rod sections, which are fed over a draw bench either by a reel or in the shape of elongate rods; an adjoining furnace unit with conveyer screw, where the pieces are uniformly heated to a temperature of 600–800° C.; and, following the furnace, a finishing press where the pre-shaped blanks are pressed into nut form in a heated condition at a temperature of about 550–750° C.

A further feature is the arrangement of a conveyer belt between the preshaping press and the furnace unit; this belt feeds the pre-shaped blanks to a charging device which feeds said blanks into the furnace in timed relationship with the operation of the finishing press.

Another element in the aforedescribed combination is a short guide channel provided for conveying the heated pre-shaped blanks from the furnace in aligned order to the finishing press.

The furnace unit of the combination is advantageously designed as a muffle furnace having a rotating cylinder which supports at its inner wall a screw for the transportation of the pre-shaped blanks through the furnace. At the end of the furnace unit, a temperature-control element is so arranged as to project into the discharge end of the furnace; the element is connected with a device for the automatic regulation of the furnace temperature and determination of the temperature of the pre-shaped blanks leaving the furnace.

Finally, the combination comprises a special discharge arrangement for the blanks leaving the furnace in that the guide channel between the furnace unit and the guide channel between the furnace unit and the finishing press is formed as a chute which is so devised that by means of a pivoted closing member, e.g., a flap, the channel can either be connected to the finishing press or, when desired, be closed with respect thereto, the passage being then open for direct discharge of blanks through the chute to the open.

The combination of the units described above makes it possible to produce nuts in accordance with this invention in a completely automatic manner. The cutting and pre-shaping of rod segments in the cold state affords high dimensional accuracy in the production of pre-pressed blanks. A contributing factor is the drawing bench arranged ahead of the cutter and first press which performs a preliminary drawing operation on the rod taken in by the shearing device whereby the rod sections acquire the exact size for the pre-shaping press.

The pre-shaped blanks are fed to the furnace unit by means of the conveyer belt with the aid of a unit which operates in timed relationship with the finishing press arranged behind the furnace unit, thereby delivering the correct number of blanks for passage through the furnace.

In the furnace unit the pre-shaped blanks are evenly transported and heated by means of a rotating cylinder and a screw conveyer contained therein, so that they will all leave the furnace at uniform temperature. Between furnace and finishing press the aforementioned guide channel feeds the pre-shaped blanks into the latter. The short length of the guide channel prevents a rapid lowering of the blank temperature and makes it possible to shape the nuts into final form with a temperature drop of at most 50° C. from the furnace temperature. From the finishing press the nuts are passed on to a conventional thread-cutting machine.

The described system not only manufactures nuts of high dimensional accuracy in a completely automatic manner, but also makes it possible substantially to surpress flake formation. Also, upon failure of some of the individual units it is not necessary to cut off operations in the entire plant, but it is sufficient to discontinue the work only in the unit which is out of order while continuing operations in the other units. For instance, the finishing press with the furnace may be cut out while pre-shaping of the rod sections continues. On the other hand this pre-shaping press may be discontinued when a large stock of pre-pressed blanks exists, while the finishing press continues working.

In the drawing:

FIGS. 1 and 2 show diagrammatically the cold-shaping stage of the process according to the invention;

FIGS. 3 and 4 diagrammatically illustrate the hot-shaping of the process;

FIG. 7 shows the means for discharging the heated pre-pressed blanks from the furnace; and FIG. 7a illustrates a detail in the discharge device.

Figure 1:
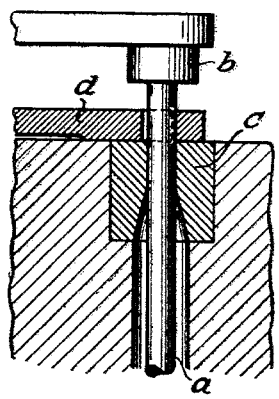

Referring now to the drawings, FIG. 1 shows a rod $a$ of circular cross section in the first one of several consecutive work stations. There, the rod is advanced through a shearing device c to a stop b. A slidable knife d is then passed over the surface of device c and cuts off a slug or rod section e. In a second station, FIG. 2, the blank e is pressed between two plungers, f and g, to form a round h.

Figure 3:
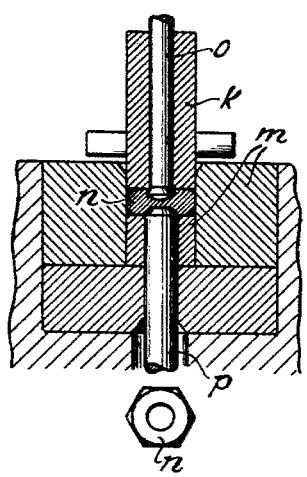
Figure 4:
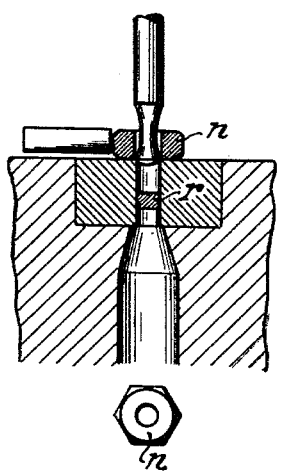
Figure 6:
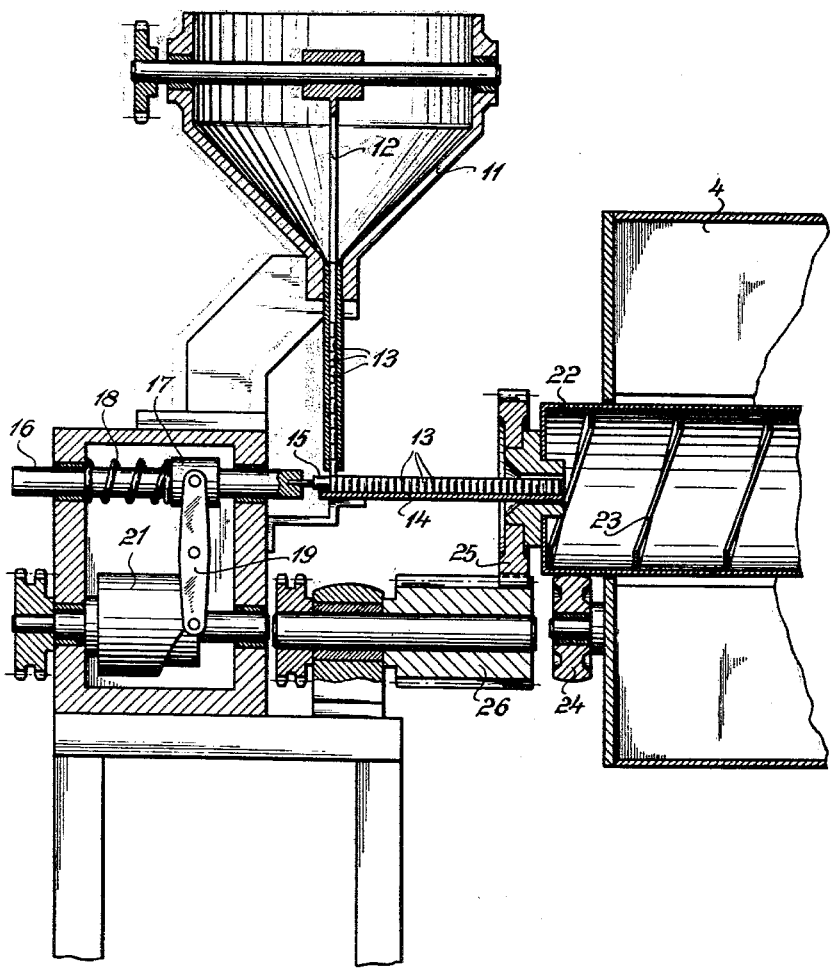
FIG. 6 illustrates the feeding of preliminarily pressed blanks to the furnace.

In an intermediate furnace, e.g., as shown in FIGS. 6 and 7, the round h is heated to a temperature between about 600 and 800° C. and from there it is conveyed to the stations illustrated in FIGS. 3 and 4.

The station in FIG. 3 comprises a matrix or lower die m of hexagonal cross section and a plunger k between which the undersized round is shaped by axial compression and consequent radial expansion into a blank n, whereupon punchers o and p are brought down on the blank for making dents therein; in the station shown in FIG. 4 the blank is pierced through by a puncher s, which simultaneously pushes out the center r.

Figure 5:
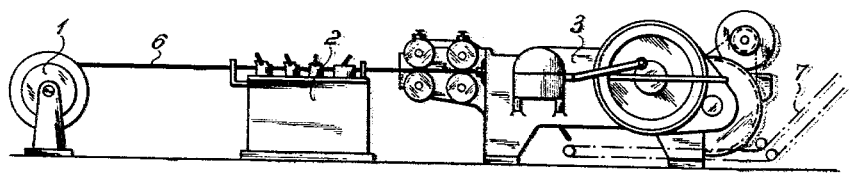
FIGS. 5a and 5b are diagrammatic views of the entire plant.
Figure 5:
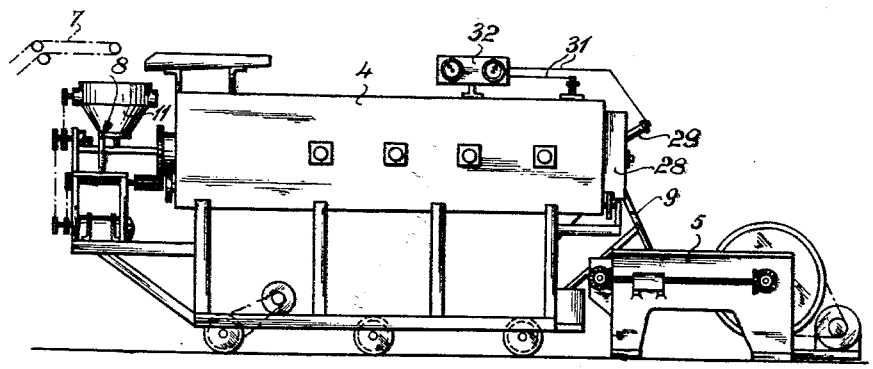

As shown in FIGS. 5a and 5b, the plant for carrying out the process of FIGS. 1–4 comprises a reel 1, a draw bench 2, a cutting device and preliminary press 3, a furnace unit 4 and a finishing press 5.

Figure 2:
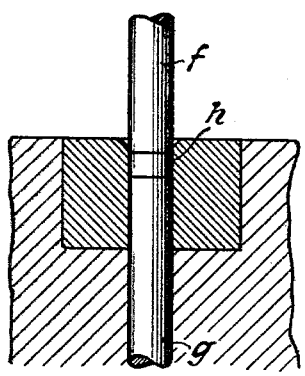

From the reel 1 a rod 6 is drawn through bench 2, the bench being preferably pushed onto the rod and being moved along as the rod is pulled into pre-shaping press 3. The individual pieces are cut and preliminarily pressed, as illustrated in FIGS. 1 and 2, in the press 3 from where they are discharged onto a conveyor 7 which moves them to a furnace 4 via a charging device 8.

The blanks are made to travel through the furnace where they are heated up to 600–800° C. From there the blanks are conveyed by a guide channel 9 to the finishing press 5, the paths between furnace and finishing press being so adjusted that the blanks will be cooled down by not more than 50° C. Either at the end of the furnace or at the guide channel, an aligning device is arranged for orientation of the blanks in the same direction.

As more fully illustrated in FIG. 6, a hopper 11 is shown in front of the furnace 4 with an agitating member 12 for aligning the blanks 13 in downward direction and guiding them to a feeder trough 14. The trough 14 terminates at the furnace while a pusher 15 arranged at its opposite end moves the blanks toward the furnace. The pusher is connected to an axially movable bar 16 carrying a block 17 which is controlled by a spring 18 and to which a lever 19 is pivotally connected. The lever 19 is in engagement with a cam 21 which by rotation causes a reciprocation of rod 16 with pusher 15.

The movement of the rod 16 and pusher 15 is dependent on the movement of the finishing press 5 so that pusher 15 will feed pre-shaped blanks 13 to the furnace in timed relationship with the operation of finishing press 5. The furnace is a muffle furnace and has a rotating cylinder 22 supporting a conveyer screw 23. At the inlet end cylinder 22 is supported by a slide bearing 24 and is driven by the engagement of a gear 25 with a gear 26 in sliding engagement therewith.

The discharge end of the rotating cylinder 22 has a funnel-shaped enlargement, FIG. 7, which is closed by the rear wall 28 of the furnace except for a discharge opening 27. A temperature-control element 29 is mounted in wall 28 and extends into the rear end of the furnace cylinder for measuring its temperature. Element 29 is connected by lines 31 to a control device 32 which automatically regulates the temperature. The discharge end of the furnace is supported by a bearing 33 in a manner which prevents axial displacement. Guide channel 9 forms a chute which leads from the discharge opening 27 in the furnace wall 28 to the finishing press 5.

From channel 9 a tube 34 is branched off on which a flap 35 is pivotally mounted which alternatingly opens and closes tube 34 and channel 9 respectively. Tube 34 serves for the discharge of the heated pre-shaped blanks and emptying of the furnace when disturbances occur in the finishing press.

In FIG. 7a a mechanism is shown, by way of example, which serves for actuating flap 35. In this mechanism flap 35 is mounted on a shaft 35a, supported in bearings 35b and 35c. Also attached to the shaft is a hand wheel 35d for adjusting the flap in the desired position. A spontaneous shifting of the shaft can be avoided either by providing sufficient friction between the shaft and the bearings, or by inserting a hook-shaped pin member 35e which passes through holes provided in the shaft and in one of the bearings, e.g., bearing 35c, thereby securing the shaft in a given position with respect to the bearing and controlling the position of the flap. Several bores are provided in the shaft so that the flap may be adjusted in different positions.

It should be understood that any other locking device could be used instead of pin 35e, e.g., a rack and pinion and a lever could be used instead of the hand wheel.

This flap-actuating device is only one of many which may be used with similar results.

What we claim is:

1. A method of making nut blanks from rod stock having a generally round cross-section, comprising the steps of:
   (a) shearing sections of a predetermined length from said rod stock;
   (b) forming undersized slugs by flattening said sections in a generally unheated state by compressing them axially;
   (c) heating the slugs so flattened to a temperature between substantially 600° and 800° C.;
   (d) indenting the so heated slugs axially while expanding them radially under renewal axial pressure against polygonally adjoining surfaces; and
   (e) piercing the so indented polygonal bodies thus formed.

2. A method of making nut blanks from rod stock having a generally round cross-section, comprising the steps of:
   (a) shearing sections of a predetermined length from said rod stock;
   (b) forming undersized slugs by flattening said sections in a generally unheated state by compressing them axially;
   (c) heating the slugs so flattened to a temperature between substantially 600° and 800° C.;
   (d) indenting the so heated slugs axially while expanding them radially under renewed axial pressure against polygonally adjoining surfaces at a temperature between substantially 550° and 750° C.; and
   (e) piercing the so-indented polygonal bodies thus formed.

3. A method of making nuts from rod stock having a generally round cross-section, comprising the steps of:
   (a) shearing sections of a predetermined length from said rod stock;
   (b) forming undersized slugs by flattening said sections in a generally unheated state by compressing them axially;
   (c) heating the slugs so flattened to a temperature between substantially 600° and 800° C.;
   (d) indenting the so heated slugs axially while expanding them radially under renewed axial pressure against polygonally adjoining surfaces;
   (e) piercing the so indented polygonal bodies thus formed to form blanks; and
   (f) internally threading the polygonal blanks.

4. A method of making nuts from rod stock having a generally round cross-section, comprising the steps of:
   (a) shearing sections of a predetermined length from said rod stock;
   (b) forming undersized slugs by flattening said sections in a generally unheated state by compressing them axially;

(c) heating the slugs so flattened to a temperature be-between substantially 600° and 800° C.;

(d) indenting the so heated slugs axially while expanding them radially under renewed axial pressure against polygonally adjoining surfaces at a temperature between substantially 555° and 750° C.;

(e) piercing the so indented polygonal bodies thus formed to form blanks; and (f) internally threading the polygonal blanks.

References Cited by the Examiner

UNITED STATES PATENTS

| | | | |
|---|---|---|---|
| 1,636,955 | 7/27 | Golding | 10—86 |
| 1,728,341 | 9/29 | Golding. | |
| 1,832,168 | 11/31 | Wilcox | 10—76 |
| 2,288,643 | 7/42 | Purtell. | |
| 2,657,403 | 11/53 | Eade | 10—77 |
| 2,698,950 | 1/55 | Van Haandel | 10—76 |

ANDREW R. JUHASZ, *Primary Examiner.*

ARTHUR B. MILLER, CARL W. TOMLIN, WILLIAM W. DYER, Jr., *Examiners.*